Patented Sept. 22, 1942

2,296,412

UNITED STATES PATENT OFFICE 2,296,412

HALOMETHYL ALIPHATIC AMINO COMPOUNDS AND PROCESSES OF MAKING THEM

Edgar Wolf, Krefeld, Germany, assignor to Heberlein Patent Corporation, New York, N. Y., a corporation of New York No Drawing. Application June 17, 1939, Serial No. 279,659. In Germany December 4, 1936

7 Claims. (Cl. 260—295)

This invention relates to reaction products of amides and processes for making the same.

This application is a continuation-in-part of my copending application, Serial No. 177,054, filed November 29, 1937.

I have found in accordance with my invention a series of new and useful products, being alpha-halide derivatives of amides containing an aliphatic radical of at least ten carbon atoms, two mols of formaldehyde for each mol of amide and a hydrohalic acid. The said radical may be a naphthenic radical containing an aliphatic portion of 10 carbon atoms. The process and resulting products may employ, in addition, a substance which reacts to render the reaction product readily soluble in water. Substances which I prefer for this purpose are, for example, pyridine or other tertiary amine, forming a water-soluble quaternary ammonium compound with the amide-formaldehyde-halogen compound. The said products are particularly useful, for instance, in producing water-repellence in textiles and other materials, as stated in said above-mentioned application, but their use is not restricted thereto. The expression "formaldehyde," as used in this specification and in the appended claims, is intended to include not only formaldehyde, but also its polymers and substances splitting off formaldehyde under the reaction conditions of the process.

The principal objects of the present invention, accordingly, are to provide a series of useful compounds of the type mentioned and to produce simple, efficient processes for the manufacture of such compounds.

The invention, accordingly, consists in the novel products as well as the novel processes and steps of processes according to which such products are manufactured, the specific embodiments of which are described hereinafter by way of example and in accordance with which I now prefer to practice the invention.

Substances which I have successfully made in accordance with my invention include the following:

The reaction product of stearic acid amide, trioxymethylene, and dry hydrochloric acid gas.

The reaction product of stearic acid amide, trioxymethylene, and dry hydrochloric acid gas, rendered water-soluble by pyridine.

The reaction product of montanic acid amide, trioxymethylene, and dry hydrochloric acid gas, rendered water-soluble by pyridine.

The reaction product of stearic acid methylol amide, trioxymethylene, and dry hydrochloric acid gas, rendered water-soluble by pyridine.

The reaction product of stearic acid methylol amide, trioxymethylene and dry hydrochloric acid gas.

The reaction product of bicyclic naphthenic acid amide, trioxymethylene and dry hydrochloric acid gas.

The above products, combined with pyridine, are readily soluble in water. Those uncombined are readily soluble in a non-aqueous solvent, such as benzine, for example. Combination with pyridine or similar material with any of the substances of the above list will render them water-soluble.

It is known to prepare condensation products by reaction of fatty acid amides with aldehydes in the presence of acids or salts having an acid reaction, as for example, as set forth in French Patent No. 792,589. However, the products obtained by this process are insoluble in water and cannot be brought into water-soluble form, even with the aid of tertiary amines. The melting point of the finished compounds lies substantially higher than that of the fatty acid amide which is employed. Furthermore, the condensation products which are obtained are difficult to dissolve or insoluble in organic solvents.

I have discovered, in accordance with my invention, that hydrohalic acid may be combined with fatty acid amides in the presence of formaldehyde or its polymeric form, such as trioxymethylene, to produce methyl-halide derivatives of the fatty acid amides, which differ from the above-mentioned products of the French patent and may be employed in processes as described in said copending application Serial No. 177,054 for producing water-repellence.

In contradistinction to the condensation products prepared by the process of the said French patent, the methyl-halide derivatives produced in accordance with my invention have a melting point which is generally still substantially below that of the starting material. These methyl-halide derivatives, and in particular their quaternary ammonium compounds, are easily soluble in various solvents.

In place of the fatty acid amides given, as above indicated the methylol compounds of the fatty acid amides may also be employed. Instead of fatty acid amides, as above stated, I may employ naphthenic acid amides, but in either group only such amides are to be employed as have a saturated alkyl radical of at least 10 carbon atoms.

The products in the above list have been prepared as follows. The examples given below are to be regarded as illustrative and the invention is not to be considered as restricted thereto, except as indicated in the appended claims.

*Examples*

1. Into a mixture, at a temperature of about 40° C. (104° F.), of 284 grams of stearic acid amide, 1500 grams of benzine, and 60 grams of trioxymethylene, dry hydrochloric acid gas is introduced until the formation of the methyl chloride compound takes place, which is recognizable purely externally by the clearing-up of the benzine solution. The reaction water collected at the bottom of the vessel is drained off, the benzine and the excess hydrochloric acid are driven off in a vacuum, and the methyl chloride compound obtained. It has a melting point of about 55° C. (131° F.). The product so obtained may be used as such or may be combined with a tertiary amine to produce a water-soluble product. For this purpose, it is stirred with 90 grams of pyridine at about 100° C., whereupon the pyridine compound is formed, which is soluble in water.

2. Into a mixture, at a temperature of 45° C. (113° F.), of 422 grams of montanic acid amide, 2000 grams of benzine, and 60 grams of trioxymethylene, dry hydrochloric acid gas is introduced until the formation of the methyl chloride compound takes place. The latter is treated as stated in Example 1 and is stirred with 90 grams of pyridine.

3. Into a mixture, at a temperature of 45° C. (113° F.), of 314 grams of stearic acid methylol amide, 1500 grams of benzine, and 30 grams of trioxymethylene, dry hydrochloric acid gas is introduced until the formation of the methyl chloride compound takes place. The latter is treated as stated in Example 1 and is stirred with 90 grams of pyridine.

4. Into a mixture, at a temperature of about 40° C. (104° F.), of 284 grams of stearic acid amide, 1500 grams of benzine, and 60 grams of trioxymethylene, chlorine gas is introduced until the formation of the methyl chloride compound takes place, which is recognizable purely externally by the clearing-up of the benzine solution. The reaction water collected at the bottom of the vessel is drained off, the benzine and the excess chlorine are driven off, in a vacuum, and the methyl chloride compound obtained. It has a melting point of about 55° C. (131° F.). The product so obtained may be used as such or may be combined with a tertiary amine to produce a water-soluble product. For this purpose, it is stirred with 90 grams of pyridine at about 100° C., whereupon the pyridine compound is formed which is soluble in water.

5. Into a mixture, at a temperature of about 40° C. (104° F.), 1500 grams of benzine, and 260 grams of bicyclic naphthenic acid amide of high molecular weight, and 60 grams of trioxymethylene, dry hydrochloric acid gas is introduced until the formation of the methyl chloride compound takes place, which is recognizable purely externally by the clearing-up of the benzine solution. The reaction water collected at the bottom of the vessel is drained off, the benzine and the excess hydrochloric acid are driven off in a vacuum, and the methyl chloride compound obtained. It has a melting point of about 55° C. The latter is treated as stated in Example 1 and is stirred with 90 grams of pyridine.

It will be noted that in the examples above, employing trioxymethylene, except Example 3 that an amount of trioxymethylene is employed equal to two mols of formaldehyde for each mol of amide used. In the case of Example 3, stearic acid methylol amide is treated which already contains one mol of formaldehyde, and then a second mol of formaldehyde is introduced in the form of trioxymethylene.

The process of the invention for the manufacture of the chemicals may be carried out with simple apparatus at relatively small expense.

The term "hydrohalic acid" as used in the appended claims is intended to designate hydrochloric, hydrobromic or hydriodic acid.

While the invention has been described in detail according to the preferred manner of carrying out the process, it will be obvious to those skilled in the art, after understanding the invention, that changes and modifications may be made therein without departing from the spirit or scope of the invention, and it is intended in the appended claims to cover all such changes and modifications.

What is claimed as new and desired to be secured by Letters Patent is:

1. The reaction product of a fatty acid amide containing an aliphatic radical of at least ten carbon atoms, 2 mols of formaldehyde for each mol of fatty acid amide, and hydrochloric acid, said reaction product being then combined with a tertiary amine.

2. A process which comprises bringing together under reaction conditions a fatty acid amide having an aliphatic radical of at least ten carbon atoms, formaldehyde, and a hydrohalic acid, there being present two mols of formaldehyde for each mol of amide, and combining with the reaction product resulting therefrom a tertiary amine.

3. A process which comprises bringing together under reaction conditions a fatty acid methylol amide having an aliphatic radical of at least ten carbon atoms, one mol of formaldehyde for each mol of methylol amide and a hydrohalic acid and combining with the reaction product resulting therefrom a tertiary amine.

4. The reaction product of stearic acid methylol amide, one mol of formaldehyde for each mol of methylol amide, and a hydrohalic acid thereafter reacted with pyridine.

5. The reaction product of montanic acid amide, two mols of formaldehyde for each mol of said acid amide, and hydrochloric acid thereafter reacted with pyridine.

6. The reaction product of a fatty acid amide containing an aliphatic radical of at least ten carbon atoms, two mols of formaldehyde for each mol of fatty acid amide, and hydrohalic acid, said reaction product being then combined with a tertiary amine.

7. The reaction product of stearic acid amide, two mols of formaldehyde for each mol of said acid amide, and hydrochloric acid thereafter reacted with pyridine.

EDGAR WOLF.